United States Patent [19]

Shimizu

[11] Patent Number: 5,229,654
[45] Date of Patent: Jul. 20, 1993

[54] POWER SOURCE CONTROL CIRCUIT AND AN ELECTRONIC DEVICE WITH SUCH POWER SOURCE CONTROL CIRCUIT

[75] Inventor: Yoshikazu Shimizu, Osaka, Japan

[73] Assignee: Matsushita Electric Industrial Co., Ltd., Osaka, Japan

[21] Appl. No.: 726,980

[22] Filed: Jul. 8, 1991

[30] Foreign Application Priority Data

Jul. 16, 1990 [JP] Japan .................................. 2-185421

[51] Int. Cl.$^5$ ............................................. H01H 47/00
[52] U.S. Cl. ....................................... 307/125; 361/170
[58] Field of Search ......................... 307/116, 125, 139; 361/160, 170, 189, 190, 187

[56] References Cited

U.S. PATENT DOCUMENTS 4,937,703 6/1990 Adams ................................. 361/187
5,055,962 10/1991 Peterson et al. ..................... 361/187

FOREIGN PATENT DOCUMENTS 59-105119 6/1984 Japan .
59-146324 8/1984 Japan .
63-085914 4/1988 Japan .

Primary Examiner—Jeffrey A. Gaffin
Attorney, Agent, or Firm—Stevens, Davis, Miller & Mosher

[57] ABSTRACT

An electronic device, such as a color television receiver, is provided with a main switch and a non-volatile memory unit which stores the previous on/off state of the power source for the electronic device. The device is powered on when the main switch is switched from off to on, regardless of the contents of the non-volatile memory unit.

8 Claims, 4 Drawing Sheets

F I G. 1
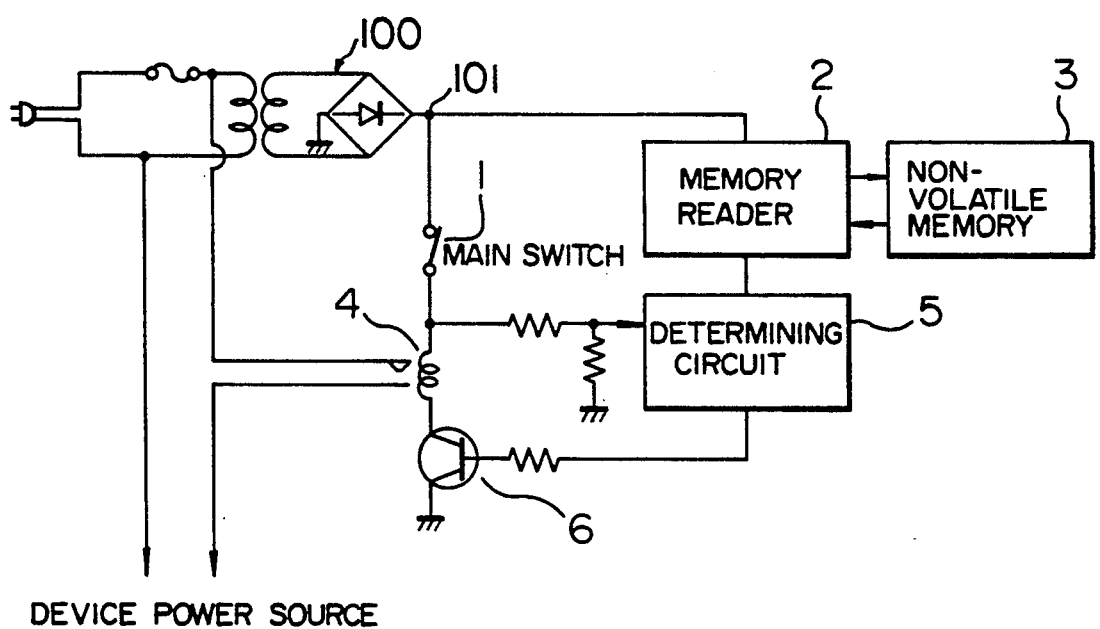

FIG. 3

AC POWER SOURCE : ON

| CASE | DETERMINATION | Bi<br>1<br>MAIN SWITCH STATE<br>ON:H<br>OFF:L | Ai<br>3<br>MEMORY CONTENT<br>H<br>L | Bi × Ai<br>5<br>DETERMINING CIRCUIT<br>1 ∩ 3 | Ci<br>6<br>TRANSISTOR<br>= {L:OFF<br>{H:ON | 4<br>RELAY<br>L:OFF<br>H:ON |
|---|---|---|---|---|---|---|
| CONVENTIONAL | I | OFF (L) | L | L × L | OFF L | OFF |
| | II | OFF (L) | H | L × H | OFF L | OFF |
| | III | ON (H) | L | H × L | OFF L | OFF |
| | IV | ON (H) | H | H × H | ON H | ON |
| | V | CHANGE OFF → ON (L) (H) | × | EDGE DETECTION ※ | ON H | ON |

※ EDGE DETECTION → {Bj=L} ∩ {Bj+1=H} = H

POWER SOURCE CONTROL CIRCUIT AND AN ELECTRONIC DEVICE WITH SUCH POWER SOURCE CONTROL CIRCUIT

BACKGROUND OF THE INVENTION

1. Field of the Invention

The present invention relates to a power source control circuit for use in an electronic device such as, a television receiver having two kinds of power source turning on/off means. Namely, a main switch is provided in the electronic device for turning off the device when the main switch is turned off and a remote control switch effective only when the main switch is in the "on" position, to turn the device on/off through the use of a remote control, or through a button located on the electronic device. More particularly the present invention relates to a power sour circuit which necessarily turns on the power source of the electronic devices, irrespective of the state of a memory circuit, when the main switch is turned on and maintains the previous on/off state of the power source after a power stoppage occurs.

2. Description of the Related Art

The conventional power source control circuits only operate to maintain the previous on/off state of the power source. FIG. 5 is a block diagram of a conventional relay which turns on/off the power source of an electronic device, which comprises a transistor 9 which drives the relay 8; a non-volatile memory 11 which stores data n the state of the power source; a memory reader 10 which reads the contents of the memory 11 to control the transistor 9.

The operation of the conventional power source control circuit will be described with reference to FIG. 5 in which when the main switch 7 is turned on, the memory reader 10 reads data from the non-volatile memory 11 to see if the previous state of the power source of the electronic device is on. If so, it drives the transistor 9 to thereby drive the relay 8 and hence to operate the electronic device. If the contents read from the memory 11 indicate that the previous state of the power source is off, the memory reader 10 does not drive the transistor 9 and hence the relay 8.

By such operation, the electronic device is not operated even if the main switch 7 is turned on so long as the contents of the non-volatile memory 11 indicate that the previous state of the power source is off.

SUMMARY OF THE INVENTION

In order to solve the above problems, the present invention provides a power source control circuit for an electronic device which necessarily operates the electronic device when the main switch is turned on.

In the power source control circuit for the electronic device according to the present invention, a non-volatile memory, a memory reader and a determining circuit operate even if the main switch is not on to a check the state of the main switch and the output of the reader to thereby control the relay.

According to the present invention, the above arrangement permits the electronic device to be turned on by detecting a change of the main switch from off to on even if the contents of the non-volatile memory indicate that the previous state of the power source is off.

BRIEF DESCRIPTION OF THE DRAWINGS

FIG. 1 is a block diagram of a power source control circuit of one embodiment of the present invention.

FIG. 3 shows a table used for determining the operation and control of the power source control circuit.

DESCRIPTION OF THE PREFERRED EMBODIMENT

Figure 2:
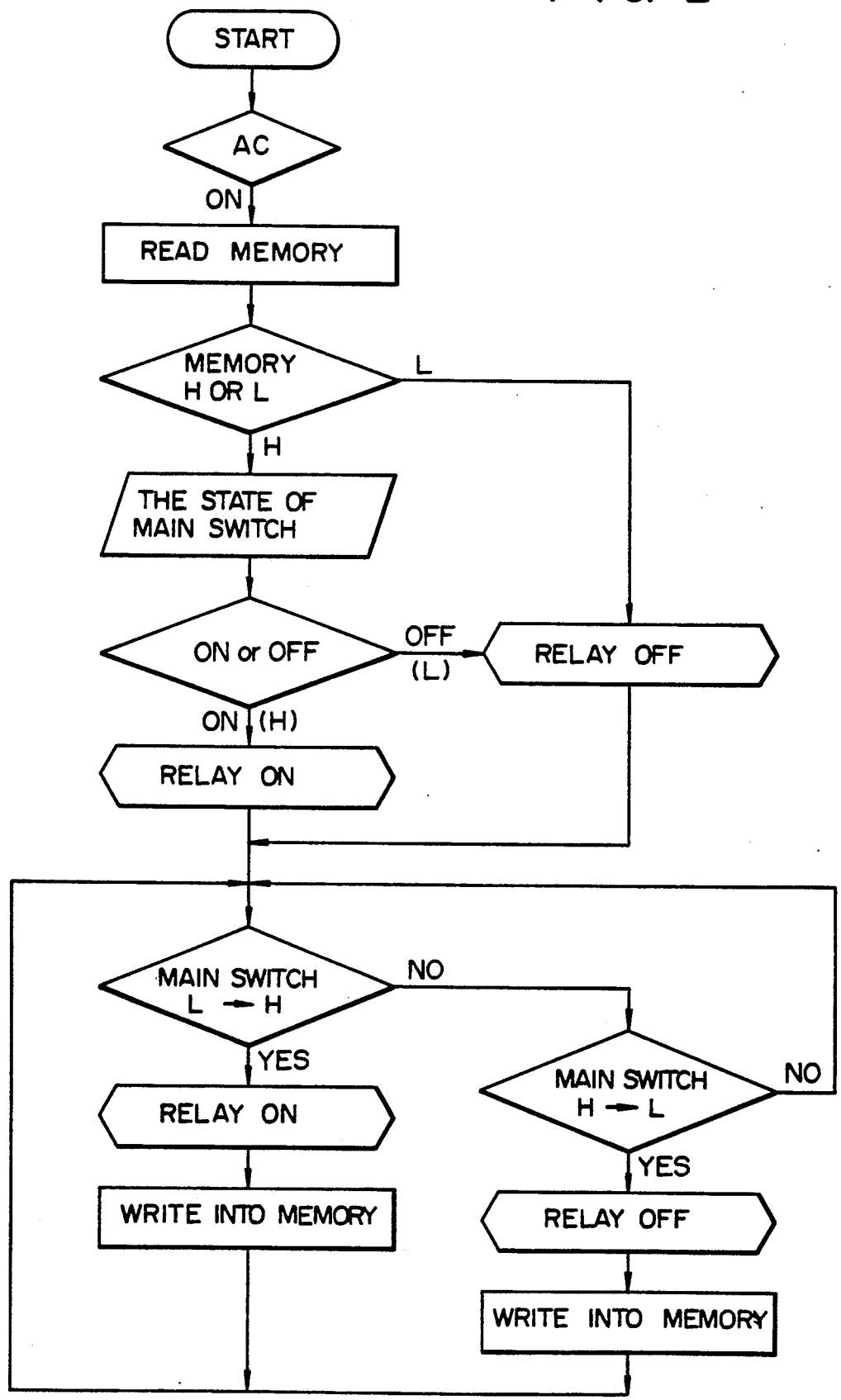
FIG. 2 is a flowchart indicative of the operation and control of the power source control circuit.

A power source control circuit of one embodiment of the present invention will be described with reference to the drawings.

FIG. 1 is a block diagram of a power source control circuit according to the present invention. FIG. 1 illustrates a main switch 1; a relay 4 which turns on/off a power source of an electronic device such as a television receiver; a transistor 6 which drives the relay 4; a non-volatile memory 3 which operates in response to application of the power source to store data on the state of the power source even if the main switch is not on; a memory reader 2 which operates in response to application of the power source to read the contents of the non-volatile memory 3 even if the main -switch 1 is not turned on; a determining circuit 5; which operates in response to an application of the power source even if the main switch 1 is not on to determine the output of the memory reader 2 and the state of the main switch 1 and, if the result of the determination indicates that the previous state of the power source is on and the main switch is on, it drives the transistor 6; and an AC/DC converter 100 provided with a DC output terminal 101.

In operation, if the power source is turned on (AC 100 V is applied) in FIG. 1, the memory reader 2 first operates to read the contents of the non-volatile memory 3. The determining circuit 5 reads the state of the main switch 1, and if the main switch 1 is on, drives the transistor 6 and hence the relay 4 in accordance with the state of the output of the memory reader 2 to thereby operate the electronic device. This situation includes recovery from power stoppage which occurred when the electronic device was operating. In this case, the previous state of the electronic device is preferably maintained.

If the main switch 1 is off, the transistor 6 is not driven and hence the electronic device is not operated even if the output of the memory reader 2 is on. In this case, the electronic device must not operate because the main switch is turned off even if the previous state of the electronic device was on. For example, this corresponds to turning-off of the main switch for safety's sake due to the occurrence of power stoppage.

If the main switch is switched from off to on, the transistor 6 and hence the relay 4 are driven to operate the electronic device irrespective of the output of the memory reader 2. Since the main switch 1 is turned on in this case, the electronic device is preferably operated as such.

FIG. 2 is a flowchart indicative of the operation and control of the power source control circuit of the present invention. First, it is determined whether the AC power source is on or off, or properly connected or not (power stoppage or the power source feed switch is on or off). If the AC power source is connected and is on, "high" or "low" memory contents $A_i\{H, L\}$, corresponding to the power source on/off control signal due to remote control and stored in the non-volatile memory 3, are read out. Next a "low" or "high" signal $B_i\{H, L\}$ corresponding to the open/closed state of the main switch 1 is detected. By the memory read signal $A_i\{H, L\}$ and the state detection signal $B_i\{H, L\}$ of the main switch 1, the operation $A_i \times B_i$ is performed in determining circuit 5 to thereby obtain the result of the determination $C_i\{H, L\} = A_i\{H, L\} \times B_i\{H, L\}$.

Since $C_i$ is the ANDing operation of $A_i$ and $B_i$, $C_i = H$ only when $A_i = H$ and $B_i = H$. When $C_i = H$, a bias is applied to the base of the transistor 3 to thereby render it conductive. This turns on the relay 4 and the power source. The determination in these operations and control or the results of the determination of the respective cases $A_i\{H, L\} \times B_i\{H, L\} = C_i\{H, L\}$ (on or off of the relay) are illustrated as the cases I–IV on the table of FIG. 3.

As will be obvious from the result of the determination of the cases I–IV of FIG. 3, "L" is stored in the memory 3 in the state of the case I or when the power source is turned off (the relay is turned off) by remote control. When the main switch 1 is further turned off, the state of the main switch 1 is "L", which is the most general case after viewing of the television had been completed. For example, when case I state has been brought about after completion television of a day's viewing, the power source of the television receiver is not turned on but maintained off since the FIG. 3 case III where $A_i = L$, $B_i = H$ is maintained and the relay 4 is maintained off even if the main switch is turned on next day. Therefore, even if the main switch 1 of the television receiver is turned on, the power source of the television receiver is not turned on. Provided in the determining circuit 5 is an edge detection circuit which feeds a "high" level signal to the base of the relay drive transistor 6 such that the relay 4 is turned on irrespective of the contents of the memory 3 when the state of the main switch 1 is changed from off to on. Detection of an edge is illustrated as a case V in FIG. 3. Determination of the edge detection is performed using the state $B_j\{H, L\}$ of the main switch 1 at a time $t_j$ and the state $B_{j+1}\{H, L\}$ of the main switch 1 which has changed at time $B_{j+1}$. Namely, the operations $B_j(L) \cap B_{j+1}(h) = H$, and $B_j(L) \cap B_{j+1}(H) = L$, $B_j\{H, L\} \cap B_{j+1}(L) = L$ are performed.

By this edge detection, the edge detection signal becomes "high" so as to turn on the relay 4 in correspondence to a change of the state of the main switch 1 from the case I to III of FIG. 3 and, thus, the power source is connected and fed to the electronic device.

Figure 4:
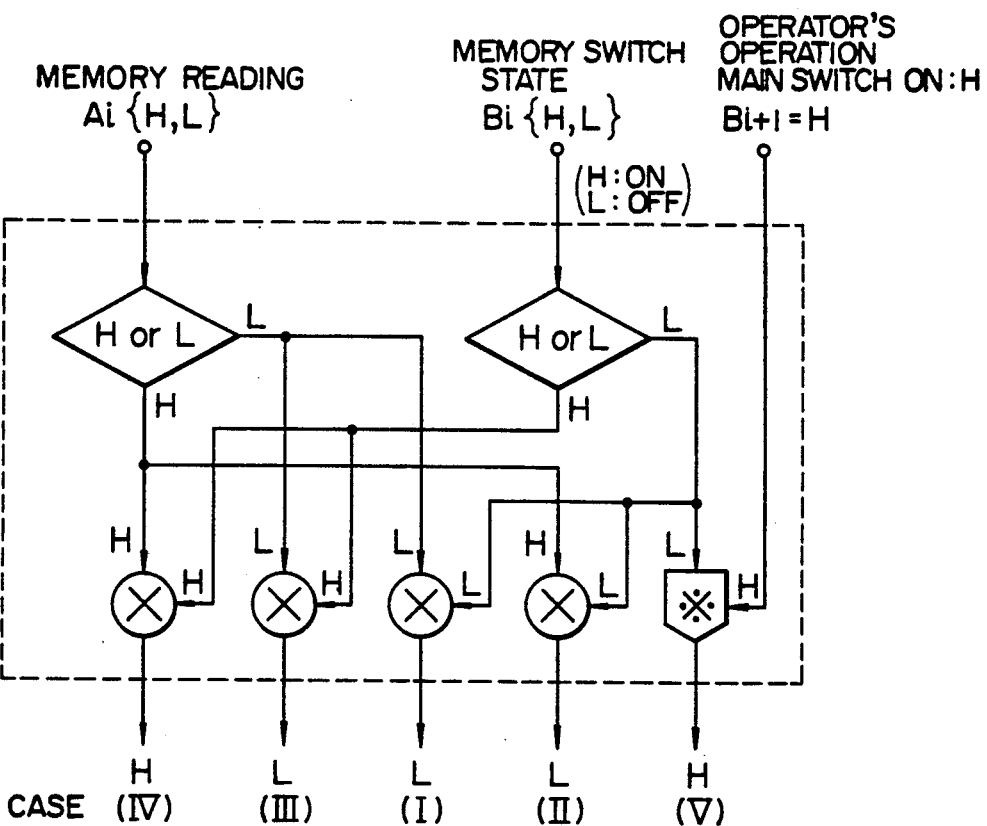
FIG. 4 is a block diagram of a determining circuit of the control circuit.
Figure 5:
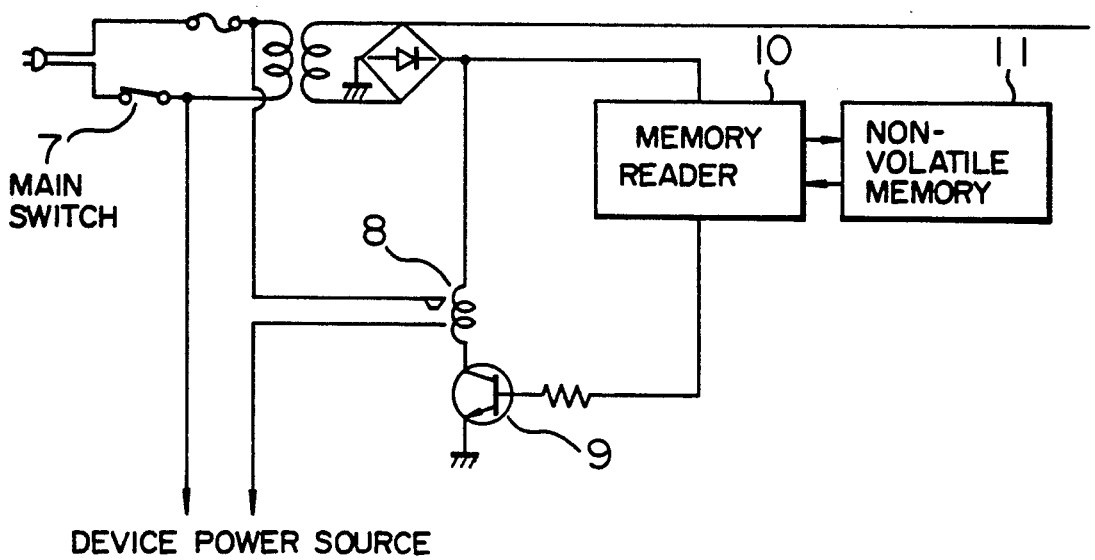
FIG. 5 is a block diagram of a conventional power source circuit.

FIG. 4 illustrates a block diagram of the determining circuit 5. In FIG. 4, the operations of the cases I–IV are performed on the basis of $A_i\{H, L\} \times B_i(H:on, L:off) = C_i\{H, L\}$ where $A_i\{H, L\}$ is the contents of the memory 4 and $B_i(H:on, L:off)$ is the state of the main switch 1. The operation of the case V in which the edge detection "high" is output in correspondence to the operator's operation to turn on the main switch 1 for $B_j(L)$ is performed.

While, conventionally, the electronic device is not turned on even if the main switch is turned on provided that the contents of the non-volatile memory indicate that the state of the power source is off, as mentioned above, the electronic device is necessarily turned on when the main switch is turned on in the present invention. Thus, the inventive power source control circuit is easy to use. If the electronic device has operated as usual before power stoppage, it will also operate as usual even in the power stoppage.

In addition, since the main switch turns on/off the relay winding current without turning on/off an AC 100 volt power in the present invention, the cost of the switch is reduced compared to the corresponding conventional switch.

I claim:

1. A power source control circuit for an electronic device, comprising:

a main switch switchable between "on" and "off" states;

a non-volatile memory means for storing data representing a previous state of a power source for said electronic device, even if said main switch is not in an "on" state;

a memory reader means, operatively associated with said non-volatile memory means, for reading said data from said non-volatile memory means, even if said main switch is not in an "on" state, and generating an output indicating said previous state;

a determining circuit, operatively associated with said main switch and said memory reader means, for receiving the output of the memory reader means and for receiving data indicating whether said main switch is in an "on" state or an "off" state to determine a control signal output for the power source, even if the main switch is not in an "on" state; and a drive circuit for controlling the power source in accordance with the output of the determining circuit;

wherein the main switch is provided in series between a power source for feeding power to the drive circuit and a winding of the drive circuit.

2. A power source control circuit according to claim 1, wherein the determining circuit detects voltage at a junction point between the main switch and the winding of the drive circuit to determine the state of the main switch.

3. A power source control circuit according to claim 2, wherein when said main switch is switched from an "off" state to an "on" state, the AC power supplies power to said electronic device regardless of said output of said memory reader means.

4. A power source control circuit according to claim 1, wherein when said main switch is switched from an "off" state to an "on" state, the AC power source supplies power to said electronic device regardless of said output of said memory reader means.

5. A power source control circuit for an electronic device, comprising:

an AC/DC converting circuit for being connected to an AC power source for supplying AC power to the electronic device, said converting device having a DC output terminal;

a main switch connected to the DC output terminal of said converting circuit and switchable between "on" and "off" states, whereby a DC voltage is supplied to said main switch from the DC output terminal of said converting circuit;

a non-volatile memory means, operatively connected to said DC output terminal of said converting circuit, for storing data representing a previous state of the AC power source for the electronic device, even if said main switch is not in an "on" state;

a memory reader means, directly connected to the DC output terminal of said converting circuit and to said memory means, for reading, even if said main switch is not in an "on" state, said data representing said previous state from said memory means and generating an output indicating said previous state;

a determination circuit for receiving said output from said memory reader means and for obtaining data indicating whether said main switch is in an "on" state or an "off" state so as to determine a control signal output for the AC power source, even if said main switch is not in an "on" state; and a drive circuit for controlling the AC power source of the electronic device in accordance with said output of said determination circuit.

6. An electronic device according to claim 5, wherein when said main switch is switched from an "off" state to an "on" state, the AC power source supplies power to said electronic device regardless of said output of said memory reader means.

7. An electronic device, comprising:

a main switch for being connected to a DC output terminal of an AC/DC converting circuit and switchable between "on " and "off" states, whereby a DC voltage is supplied to said main switch from the DC output terminal of said AC/DC converting circuit;

a non-volatile memory means for being operatively connected to said DC output terminal of said converting circuit and for storing data representing a previous state of an AC power source for the electronic device, even if said main switch is not in an "on" state;

a memory reader means for being directly connected to the DC output terminal of said converting circuit and for reading, even if said main switch is not in an "on" state, said data representing said previous state from the non-volatile memory means and generating an output indicating said previous state;

a determination circuit for receiving said output from said memory reader means and for obtaining data indicating whether said main switch is in an "on" state or an "off" state so as to determine a control signal output for said AC power source, even if said main switch is not "on" state; and a drive circuit for controlling the AC power source of the electronic device in accordance with said output of said determination circuit.

8. An electronic device according to claim 7, wherein when said main switch is switched from an "off" state to an "on" state, the AC power source supplies power to said electronic device regardless of said output of said memory reader means.

* * * * *